United States Patent
Schrewe et al.

(10) Patent No.: US 8,980,368 B2
(45) Date of Patent: Mar. 17, 2015

(54) PROCESS FOR THE PREPARATION OF PLATES FOR LEAD-ACID BATTERIES

(75) Inventors: Josef Schrewe, Brilon-Bontkirchen (DE); Norbert Bertz, Brilon-Bontkirchen (DE); Claus Zoellner, Brilon (DE)

(73) Assignee: Hoppecke Batterien GmbH & Co. KG, Brilon (DE)

( * ) Notice: Subject to any disclaimer, the term of this patent is extended or adjusted under 35 U.S.C. 154(b) by 310 days.

(21) Appl. No.: 13/102,346

(22) Filed: May 6, 2011

(65) Prior Publication Data

US 2011/0293821 A1    Dec. 1, 2011

(30) Foreign Application Priority Data

May 8, 2010  (EP) .................... 10004860

(51) Int. Cl.
| | | |
|---|---|---|
| B05D 5/12 | (2006.01) | |
| H01M 4/56 | (2006.01) | |
| H01M 4/20 | (2006.01) | |
| H01M 4/21 | (2006.01) | |
| H01M 4/22 | (2006.01) | |

(52) U.S. Cl.
CPC ......... *H01M 4/56* (2013.01); *H01M 4/20* (2013.01); *H01M 4/21* (2013.01); *H01M 4/22* (2013.01); Y02E 60/126 (2013.01)
USPC ................................................... 427/126.1

(58) Field of Classification Search
CPC ............ B05D 5/12; H01M 4/20; H01M 4/21; H01M 4/82; H01M 4/22; H01M 4/56; H01M 4/126
USPC ................................................... 427/126.1
See application file for complete search history.

(56) References Cited

U.S. PATENT DOCUMENTS

| | | | | |
|---|---|---|---|---|
| 1,670,046 | A * | 5/1928 | Plews | 34/481 |
| 1,688,399 | A * | 10/1928 | Reinhardt | 429/225 |
| 2,035,746 | A | 3/1936 | Hall | |
| 2,130,246 | A | 9/1938 | Olcott et al. | |
| 2,149,813 | A | 3/1939 | Lindstrom | |
| 2,220,004 | A | 10/1940 | Smith et al. | |
| 2,954,758 | A * | 10/1960 | Felgar et al. | 122/459 |
| 3,067,273 | A | 12/1962 | Duddy | |
| 3,899,349 | A * | 8/1975 | Yarnell | 427/343 |
| 4,982,482 | A * | 1/1991 | Wheadon et al. | 29/2 |
| 5,252,105 | A * | 10/1993 | Witherspoon et al. | 29/623.1 |
| 5,314,766 | A * | 5/1994 | Witherspoon et al. | 429/227 |
| 6,014,798 | A * | 1/2000 | Nitsche et al. | 29/2 |
| 2002/0051644 | A1* | 5/2002 | Sugimoto et al. | 396/564 |
| 2004/0007256 | A1* | 1/2004 | Durazzani et al. | 134/57 D |
| 2004/0121233 | A1* | 6/2004 | Klein et al. | 429/227 |
| 2008/0196241 | A1 | 8/2008 | Nitsche et al. | |

FOREIGN PATENT DOCUMENTS

| | | |
|---|---|---|
| CN | 101345305 | 1/2009 |
| EP | 0592028 | 4/1994 |
| EP | 0949700 | 10/1999 |
| EP | 1235287 | 8/2002 |
| EP | 1886366 | 2/2008 |
| JP | 5166504 | 7/1993 |
| WO | 2004/059772 | 7/2004 |
| WO | 2006/128621 | 12/2006 |

* cited by examiner

*Primary Examiner* — Michael Wieczorek
*Assistant Examiner* — Sarah R Anderson
(74) *Attorney, Agent, or Firm* — Harness, Dickey & Pierce P.L.C.

(57) ABSTRACT

To improve the procedure for producing plates for lead-acid batteries, it is proposed with the invention to expose the pasted plates to saturated steam in one phase of the procedure.

9 Claims, 1 Drawing Sheet

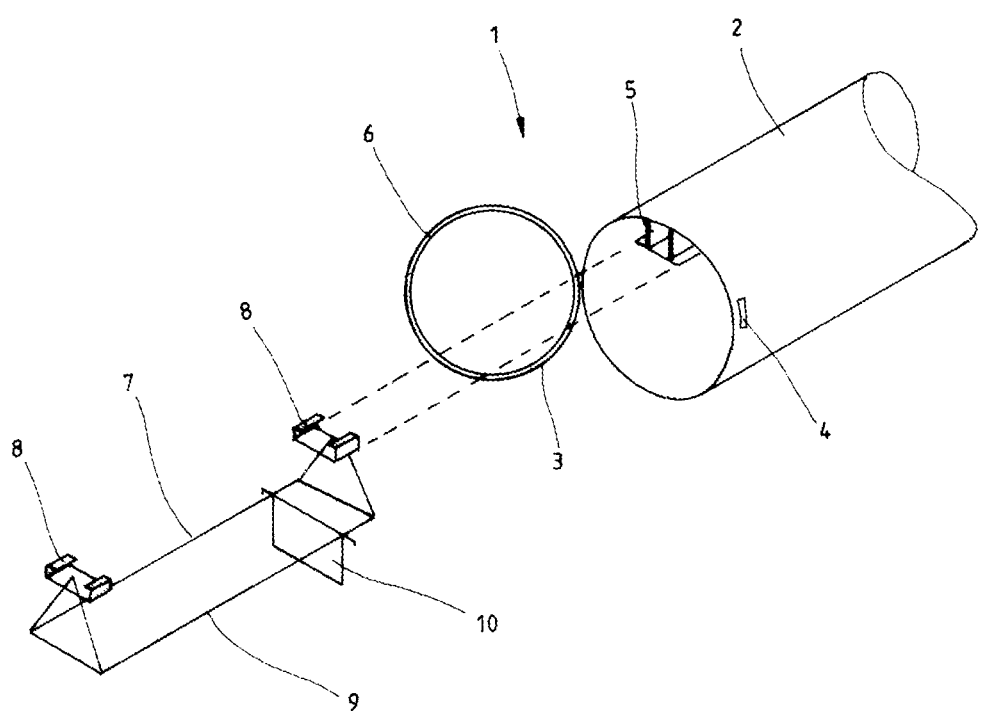

PROCESS FOR THE PREPARATION OF PLATES FOR LEAD-ACID BATTERIES

BACKGROUND OF THE INVENTION

1. Technical Field

The present inventions relates to a procedure for the preparation of lead-acid batteries.

2. Discussion

Lead-acid batteries consist of cases in which plates provided with an active lead-based compound are inserted that, in conjunction with an electrolyte, are suitable for storing and discharging a positive and negative charge. This charge can be used through connector terminals.

While grid-type carriers were predominantly used in the past to locate/position the active compound, tube plates have been added in the course of time. The carrier frame in this case consists of lead rods (cores) located essentially in parallel and connected by footplates that are surrounded by plastic tubes, for example, woven plastic mesh/non-woven tubes. They can also be square or rectangular tube pockets, for example.

The manufacture of the active compounds is intrinsically known. A positive active compound is applied in paste form to the positive plates. Curing and drying steps ensure that the primary contents leady oxide, water and lead sulfate create tribasic lead sulfates and tetrabasic lead sulfates. Such methods are described, for example, in WO/2004/059772 A2. In EP 0949700, for example, a method is described in which lead plates cure and dry within three hours in a three-stage process. A membrane is used for this purpose. EP 1235287 also describes a method for curing positive lead-acid battery plates where operations are similarly conducted by means of a porous membrane.

U.S. 2004/0121233 describes a method in which a drying gas dries the plates. A very special drying temperature sequence must be followed for several hours.

The primary contents mentioned for the active compound, leady oxide, water and sulfuric acid, for example, are mixed to form a sticky lead paste. Said paste is applied onto/into the electrode carriers that take the form of grids, tube plates or similar.

A method for the further treatment of the pasted plates is described, for example, in EP 1886336. This method assumes that the plates are disposed in stacks lying immediately adjacent one to the other. The plates are dried to a desired final dampness by the application of overpressure or a vacuum at a pressure differential of more than 10 mbar by means of an oxygenated gas.

This method also requires considerable time. Using the known methods, a total of 24 to 36 hours must be included in the planning until the plates are sufficiently cured and dried to be installed.

SUMMARY OF THE INVENTION

Taking the prior art as a point of departure, an aspect of the present invention is to provide a method for producing lead-acid battery plates that shortens the curing and drying processes overall with a substantially reduced expenditure of energy and preferably allows said method to be integrated into the overall production process.

Preferably the active compound should be converted for the most part into tetrabasic, fine-crystalline lead sulfate without the need for inoculation.

The invention proposes that the pasted plates are exposed to saturated steam in one processing step.

Within the scope of the present invention, saturated steam means an almost 100-percent steam atmosphere that can be achieved with reasonable technical expenditure. Surprisingly, it has turned out that treatment of pasted plates with saturated steam not only promotes the formation in particular of tetrabasic lead sulfate, but considerably abbreviates the curing process. The effect of saturated steam is in addition that the saturated-steam treated plates complete their final curing and drying in an ambient atmosphere and can then be installed. The process is shortened by approximately 30 percent.

In accordance with an advantageous proposal for the invention, the plates are disposed spaced apart from each other so that the surface of each plate is exposed to the same saturated steam atmosphere.

In accordance with an advantageous proposal for the invention, after the paste has been applied, the plates suspended at intervals from each other are moved into a space which can be evacuated and in which saturated steam is applied to said plates.

This can advantageously take place at temperatures between 75 and 130° C. Positive tube plates are exposed to saturated steam under pressure at higher temperatures of >120° C. The pressure that is to be set is preferably taken from the PV diagram. It can be about 1.5 bar.

Grid plates, both positive and negative, can have saturated steam applied without pressure at low temperatures, approximately 80° C. The saturated steam phase, in accordance with an advantageous proposal for the invention (30 minutes), can be set between 28 and about 45 minutes, for example, which applies to both types of plates.

Following the saturated steam phase, the plates can be exposed to ambient atmosphere. After about 20 hours, the plates are ready to use. The phase of exposure to ambient atmosphere may be a waiting loop which can be integrated into the overall production process so that the processes of producing the cases, preparing the cases and case parts, manufacture of the plates, forming the stacks, assembling the cases and so on are integrated with one another so that the production processes are considerably simplified and shortened through the procedure in accordance with the invention.

BRIEF DESCRIPTION OF THE DRAWING

Additional advantages and features of the invention can be found in the following description using the FIGURE in which:

FIG. 1 shows a schematic representation of an embodiment of a structure to carry out the method in accordance with the invention.

DESCRIPTION OF THE PREFERRED EMBODIMENTS

The production unit 1 according to FIG. 1 includes a tank-like container or vessel 2 defining an interior space which can be closed by means of a door 3. The door 3 can be tightly closed by a lock, not shown, against a counter bearing 4 on the vessel 2. The necessary gaskets are indicated by reference numeral 6.

The container can be hermetically sealed by the door 3. Connections not shown serve to evacuate the space in the interior of the vessel 2. Other lines are able to introduce steam. It is also possible to supply and remove other gasses or requisite media. The necessary control units, valve assemblies, connections and the like are configured in accordance with the prior art.

The vessel 2 in the embodiment shown has a form of carrier rail 5 in the upper area.

A stylized rack 7 is shown that shows the runners 8 that are able to cooperate with the carrier rail 5. In this way, the rack 7 can be transferred into the vessel 2 so that the rack is retained moveably against the carrier rail 5 by means of the runners 8. The rack 7 comprises a type of support frame 9 in which pasted plates can be suspended. A plate of this kind is shown in a stylized version with the reference numeral 10. The plates can be suspended on the rack spaced at a distance from each other.

The rack 7 can be moved outside the vessel 2 by means of movable carrier units, not shown. After the rack 7 has been loaded with the desired number of pasted plates 10, it is moved to the vessel 2 and hung in the carrier rail 5 and pushed into the vessel by means of the runners 8. The vessel is hermetically sealed by means of the door 3, evacuated, steam and similar is applied, depending on which procedural method is desired. Temperatures and time are adjusted. It is possible to configure the required measuring sensors in order to determine the progress of the procedure according to specific parameters.

The embodiment described is intended only for clarification and is not restrictive. In particular, the way the plates are arranged in the rack, the way the rack is arranged and can be moved in the container, the configuration of the container and such like can be varied and lie within the scope of the invention, depending on conditions.

This application claims the benefit and priority of European Patent Application No. 100004860.2, filed May 8, 2010. The entire disclosure of the above application is incorporated herein by reference.

What is claimed:

1. A method for producing positive plates for lead-acid batteries, comprising:
    applying an active paste to an electrode carrier; and
    exposing said active paste positive plates to a substantially completely steam atmosphere in one phase of making the positive plates to convert said active paste into tetrabasic lead sulfate during said phase.

2. The method from claim 1, wherein the steam atmosphere phase of the procedure is carried out for a period >28 minutes.

3. The method of claim 1, wherein the steam atmosphere is at a temperature of at least 75° C.

4. The method of claim 1, wherein the steam atmosphere is at a temperature of at least 130° C.

5. The method of claim 1, wherein the positive plates are exposed to the steam atmosphere in a position spaced apart from each other.

6. The method of claim 1, wherein the positive plates exposed to the steam atmosphere are exposed to an ambient atmosphere in a final phase.

7. The method of claim 1, wherein the positive plates are exposed to the steam atmosphere in a vessel which is hermetically sealed and evacuated.

8. A method of making positive plates for lead acid batteries, comprising:
    applying a positive active paste to an electrode carrier, the positive active paste is a mixture including leady oxide, water, and lead sulfate;
    placing the carrier on a rack;
    sliding the rack into a vessel and hanging the rack on a rail in the vessel; sealing the vessel;
    evacuating the vessel;
    introducing steam into the vessel to expose the carrier to a substantially completely steam atmosphere at a temperature of at least 75° C. for between 28-45 minutes to convert the mixture into tetrabasic lead sulfate; and
    removing the rack from the vessel and drying the carrier.

9. A method of making plates for lead acid batteries, the method comprising:
    applying a positive active paste to each one of a plurality of plates, the positive active paste is a mixture including leady oxide, water, and lead sulfate;
    coupling the plates to a single rack including runners configured to cooperate with a carrier rail within a vessel;
    coupling the runners of the rack to the carrier rail within the vessel;
    sliding the runners along the carrier rail to slide the rack into the vessel;
    hermetically sealing the vessel closed;
    introducing steam into the vessel at a temperature of at least 75° C. for between 28-45 minutes to expose the plurality of plates to a substantially completely steam atmosphere, and to convert the mixture into tetrabasic lead sulfate;
    removing the rack from within vessel; and
    drying the plates.

* * * * *